United States Patent

[11] 3,559,633

| [72] | Inventors | Jerome J. Born<br>Lincolnwood, Ill.;<br>Harry Roehm, Glenview, Ill. |
|---|---|---|
| [21] | Appl. No. | 810,950 |
| [22] | Filed | Mar. 27, 1969 |
| [45] | Patented | Feb. 2, 1971 |
| [73] | Assignee | Simonsen Metal Products Corporation<br>Chicago, Ill.<br>a corporation of Illinois |

[54] PORTABLE CAMP STOVE
16 Claims, 9 Drawing Figs.

| [52] | U.S. Cl. | 126/38 |
|---|---|---|
| [51] | Int. Cl. | F24c 3/14 |
| [50] | Field of Search | 126/38, 9, 25, 266 |

[56] References Cited
UNITED STATES PATENTS

| 1,330,862 | 2/1920 | Gilbert | 126/38 |
|---|---|---|---|
| 1,518,713 | 12/1924 | Trow | 126/38 |
| 1,742,458 | 1/1930 | Yeager | 126/38 |
| 2,302,880 | 11/1942 | Nelson et al. | 126/38 |
| 2,669,641 | 2/1954 | Becker | 126/38X |
| 2,742,893 | 4/1956 | Keffer | 126/38 |
| 2,852,016 | 9/1958 | Weatherwax | 126/9 |

*Primary Examiner*—Charles J. Myhre
*Attorney*—Prangley, Clayton, Mullin, Dithmar & Vogel ABSTRACT: There is disclosed a portable camp stove comprising a plurality of detachably connected singlepiece open-top housing modules of varying depths, at least one of which contains a burner assembly and grate, a foldable windscreen hingedly attached to and latchable in a folded position overlying the one housing, a fuel tank releasably pivotally connected to the burner assembly, means for pivotally supporting the tank on the housings externally thereof, the housings being latchable together in a closed position, and at least the shallower housing having a foldable handle for carrying the stove or supporting the shallow housing in its open position.

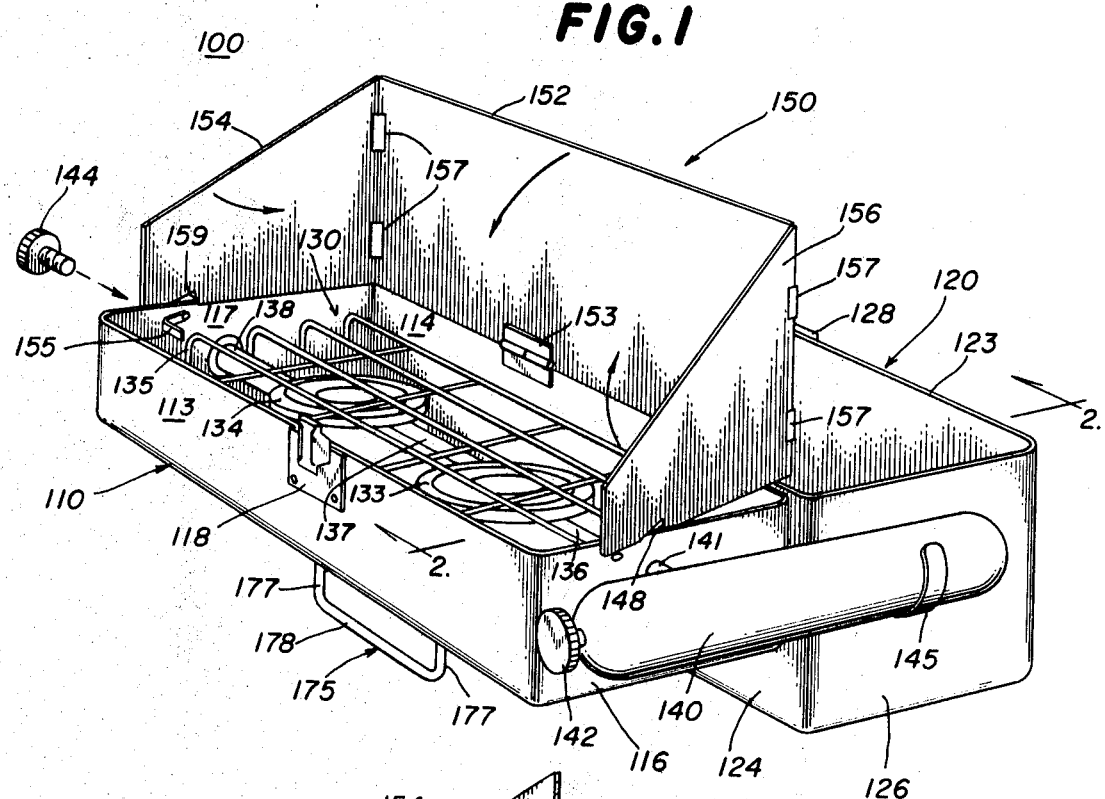
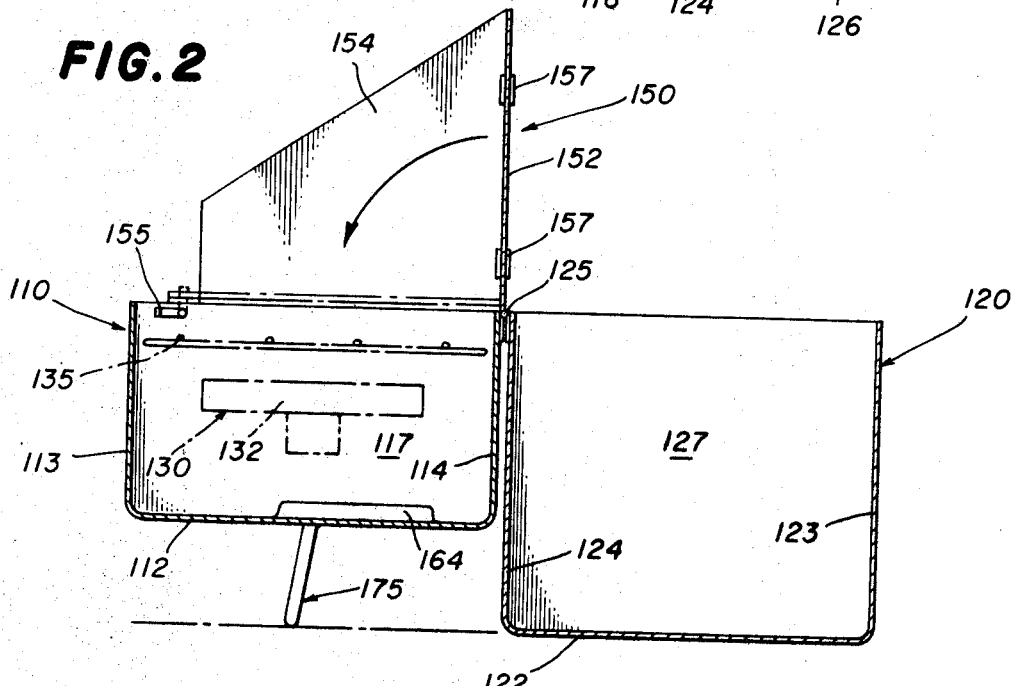

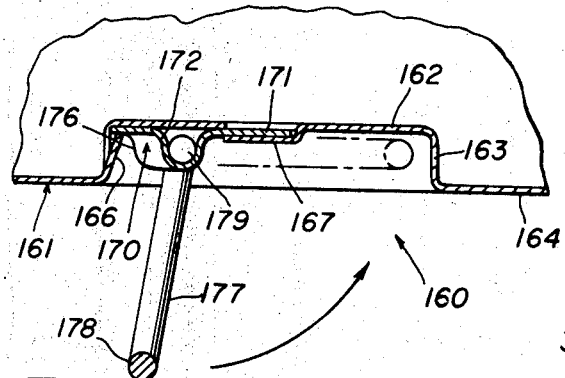
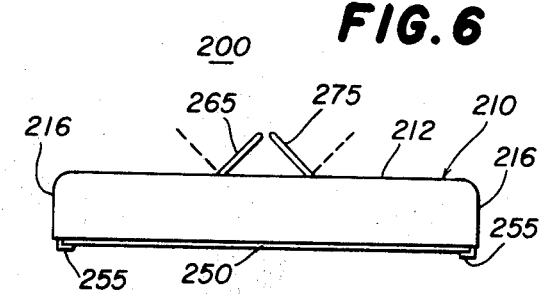
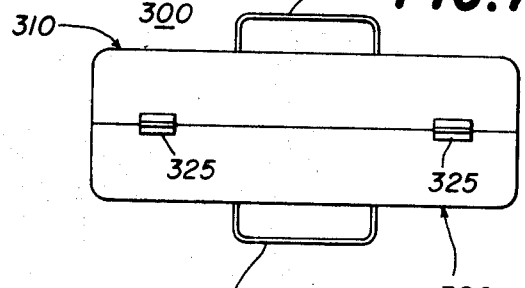
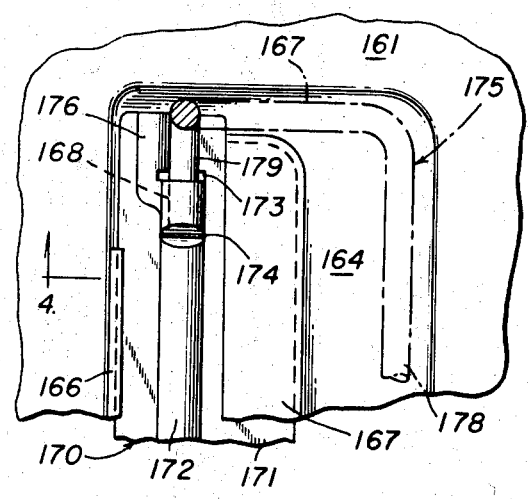
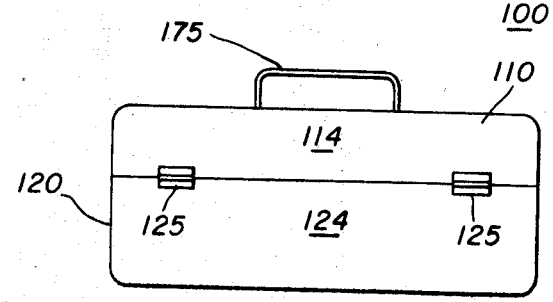
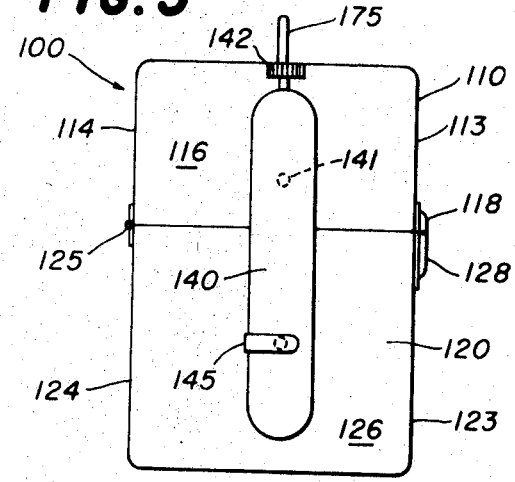
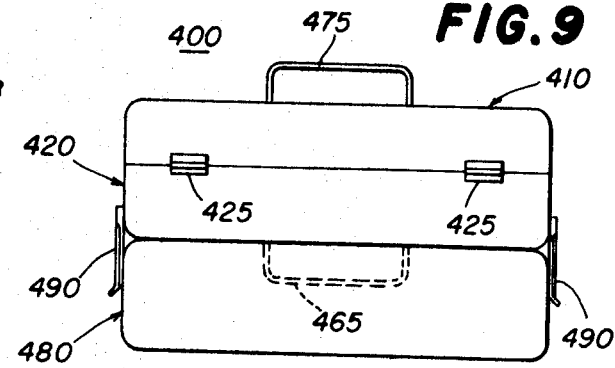

PORTABLE CAMP STOVE

This application is concerned with portable cooking apparatus, and in particular to portable camp stoves.

It is a general object of the invention to provide a portable camp stove comprising two single piece housings detachably hinged together, one of these housings containing burners and a grate and the other housing providing storage space and being adaptable for use as a dishpan when detached from the one housing.

It is also an object of this invention to provide a portable camp stove comprising a first open-top housing having a bottom wall and an encompassing upstanding sidewall, a burner assembly mounted in the first housing, a grate mounted in the first housing and overlying the burner assembly, a fuel supply unit releasably interconnected with the burner assembly for supplying fuel thereto, a second watertight open-top housing having a bottom wall and an encompassing upstanding sidewall, and hinge structure detachably interconnecting the first and second housings, the second housing being capable of serving as a storage compartment when connected with the first housing and as a dishpan when detached from the first housing, the first housing being pivotally movable on the hinge structure between an open position alongside the second housing and a closed position overlying and contacting the second housing to form a closed container for the stove.

It is another object of this invention to provide a portable camp stove of the type set forth which further includes a foldable windscreen hingedly attached to the sidewall of the first housing along the upper edge thereof, the windscreen being movable between an erected condition extending substantially vertically upwardly from the upper edge of the sidewall of the first housing and a folded condition substantially normal to the sidewall of the first housing and overlying the bottom wall thereof, and latch means for securing the windscreen to the first housing when the windscreen is in the folded condition thereof thereby providing a cover for the first housing, the second housing cooperating with the windscreen in the folded condition thereof to define a storage compartment when connected to the first housing in the closed position thereof.

Yet another object of this invention is to provide a portable camp stove of the type set forth wherein the first housing has a sidewall of a first predetermined height and the second housing has a sidewall of a second predetermined height exceeding the first predetermined height by a predetermined distance, and further including latch means for securing the second housing to the first housing in the closed position thereof, and a handle attached to the outer surface of the bottom wall of the first housing and movable between a folded configuration lying against the surface and an erected configuration disposed at an angle to the surface, the handle in the erected configuration thereof extending outwardly in a direction substantially normal to the surface a distance substantially equal to the predetermined distance, whereby the handle in the erected configuration thereof acts as a leg to support the first housing in the open position thereof and acts as a handle for carrying the stove container when the first housing is latched in the closed position thereof.

Still another object of this invention is to provide a portable camp stove of the type set forth wherein the fuel supply unit comprises a generally cylindrical fuel tank disposed externally of the first housing and releasably pivotally interconnected adjacent to one end thereof with the burner assembly for supplying fuel thereto, and a support clip pivotally mounted on the sidewall of the second housing adjacent to the connection point of the fuel tank to the burner assembly for supporting the other end of the fuel tank, the fuel tank swinging pivotally about its connection point with the burner assembly and the support clip pivotally moving to accommodate the tank when the first housing is moved between the open and closed positions thereof whereby the clip holds the tank when the first housing is in both the open and closed positions thereof.

It is another object of this invention to provide a portable camp stove of the type set forth wherein the sidewall of the second housing is of substantially the same height as the sidewall of the first housing, and further including two handles respectively attached to the outer surfaces of the bottom walls of the first and second housings and each movable between a folded configuration lying against the associated bottom wall and an erected configuration disposed at an angle to the associated bottom wall.

It is still another object of this invention to provide a portable camp stove of the type set forth which further includes a third watertight open-top housing having a bottom wall and an encompassing upstanding sidewall, latch means for detachably securing the second housing to the third housing when the second housing overlies and contacts the third housing thereby achieving a modular coupling of the housings and a corresponding increase in the storage capacity of the stove container.

Another object of the invention is to provide a portable camp stove comprising an open-top housing having a bottom wall and an encompassing upstanding sidewall, a burner assembly mounted in the housing, a grate mounted in the housing and overlying the burner assembly, a fuel supply unit releasably interconnected with the burner assembly for supplying fuel thereto, a foldable windscreen hingedly attached to the sidewall along the upper edge thereof, the windscreen being movable between an erected condition extending substantially vertically upwardly from the upper edge of the sidewall and a folded condition substantially normal to the sidewall and overlying the bottom wall, latch means for securing the windscreen to the housing when the windscreen is in the folded condition thereof thereby providing a cover for the housing, and two handles attached to the outer surface of the bottom wall and movable between a carrying configuration extending angularly toward each other and a supporting configuration extending angularly away from each other, whereby the handles in the supporting configuration thereof act as legs to support the housing when the bottom wall is disposed downwardly of the windscreen for cooking and act as handles for carrying the stove when the windscreen is latched in the folded condition thereof and is disposed downwardly of the bottom wall.

Further features of the invention pertain to the particular arrangement of the parts whereby the above-outlined and additional operating features thereof are attained.

The invention both as to its organization and method of operation, together with further objects and advantages thereof, will best be understood by reference to the following specification taken in connection with the accompanying drawings, in which:

FIG. 1 is a perspective view of a portable camp stove according to a first embodiment of this invention, comprising two housings of unequal depths shown in their open position with the windscreen in its erected condition and the handle in its erected configuration;

FIG. 2 is an enlarged view in vertical section taken along the line 2–2 in FIG. 1;

FIG. 3 is a further enlarged fragmentary plan view of the handle structure of the portable stove of FIG. 1 according to the invention;

FIG. 4 is a fragmentary view in vertical section taken along the line 4–4 in FIG. 3 and showing the handle in its supported configuration;

FIG. 5 is an end elevational view of the portable camp stove of FIG. 1 with the container closed;

FIG. 6 is a side elevational view of a portable camp stove according to a second embodiment of this invention comprising a single housing, two handles and a windscreen;

FIG. 7 is a side elevational view of a portable camp stove according to a third embodiment of this invention comprising two housings of equal depth, each having a single handle and shown in the closed position;

FIG. 8 is a reduced side elevational view of the portable camp stove of FIG. 1 with the container closed; and FIG. 9 is a side elevational view of a portable camp stove according to a fourth embodiment of this invention including a modular arrangement of three housings shown in the closed position with the housings latched together.

Referring to FIGS. 1, 2, 5 and 8 of the drawings, there is shown a portable camp stove generally designated by the numeral 100 and comprising two open-top housings generally designated 110 and 120, respectively. Each of these housings is of singlepiece seamless construction, preferably being fabricated from sheet metal by a process of stamping or deep drawing. The housing 110 comprises a generally rectangular flat bottom wall 112 integral with a pair of upstanding sidewalls 113 and 114 and a pair of upstanding end walls 116 and 117. Each of the sidewalls 113 and 114 is substantially rectangular in shape and extends upwardly from the opposite sides of the bottom wall 112 substantially normal thereto. Each of the end walls 116 and 117 is also substantially rectangular in shape and extends upwardly from the opposite ends of the bottom wall 112 substantially normal thereto, the end walls 116 and 117 and the sidewalls 113 and 114 all having the same predetermined height. Centrally disposed on the outer surface of the sidewall 113 adjacent to the upper edge thereof is the tongue portion 118 of a snap lock.

Similarly, the housing 120 comprises a substantially rectangular flat bottom wall 122 integral with a pair of upstanding sidewalls 123 and 124 and a pair of upstanding end walls 126 and 127. Each of the sidewalls 123 and 124 is substantially rectangular in shape and extends upwardly from the opposite sides of the bottom wall 122 substantially normal thereto. Each of the end walls 126 and 127 is also substantially rectangular in shape and extends upwardly from the opposite ends of the bottom wall 122 substantially normal thereto, the sidewalls 123 and 124 and the end walls 126 and 127 all having the same predetermined height which is preferably greater than the height of the walls 113, 114, 116 and 117. Centrally disposed on the outer surface of the sidewall 123 adjacent to the upper edge thereof is a latch portion 128 of the snap lock 119.

Respectively adjacent to the upper edges of the sidewalls 114 and 124 are the respective halves of a plurality of hinge assemblies 125. While two such hinge assemblies 125 are disclosed, any number may advantageously be used. Any one of a number of standard hinge assemblies known in the art may be used, but the hinges 125 are preferably of the detachable type, whereby the pin portions may readily be disengaged from the bearing portions of the hinge assemblies. In operation, when the hinge assemblies 125 are in their assembled conditions the housings 110 and 120 are pivotally connected together, whereby the housing 110 may pivot on the hinge assemblies 125 between an open position alongside the housing 120 as shown in FIGS. 1 and 2 and a closed position overlying the housing 120 as shown in FIGS. 5 and 8. In this latter closed position, the upper edges of the sidewalls 113 and 114, and of the end walls 116 and 117, respectively contact and mate with the upper edges of the sidewalls 123 and 124 and the end walls 126 and 127 and the lock portions 118 and 128 latch together thereby forming a locked closed container for the camp stove 100.

Mounted in the housing 110 is a cooking or heating apparatus generally designated by the numeral 130 and comprising a burner assembly 132, preferably including a pair of burners 133 and 134, and a grate or grillwork 135 overlying the burner assembly 132 as shown in FIGS. 1 and 2. The burners 133 and 134 are connected by a fuel conduit 137 and the burner assembly 132 is mounted on the end walls 116 and 117 of the housing 110 by a pair of conduits 136 and 138. More particularly, the conduit 136 extends from the burner 133 to the end wall 116 and the conduit 138 extends from the burner 134 to the end wall 117. The grate 135 is preferably formed of metal and may be mounted in the container 110 by any suitable means, but is preferably removably mounted so as to provide access to the burner assembly 132 and to the bottom portion of the housing 110 for cleaning and servicing of the heating apparatus 130.

Fuel for the heating apparatus 130 is supplied by a fuel tank 140 preferably being generally cylindrical in transverse cross section as shown in FIGS. 1 and 5. The tank 140 is preferably pivotally connected adjacent to one end thereof to the end wall 116 of the housing 110 by a detachable, pivotable fitting 141 and has a flow-regulating valve knob 142 at one end thereof. The pivotally mounted fitting 141 is substantially tubular in shape and is disposed through a complimentarily shaped opening in the end wall 116 and mates with the outer end of the adjacent supporting conduit 136 for providing communication between the fuel tank 140 and the burner assembly 132. The fitting 141 provides a fluidtight passage for connecting the tank 140 to the burner assembly 132. Another regulating valve knob 144 is engaged with the outer end of the other of the supporting conduits 138 through a complimentarily shaped opening in the end wall 117 for providing further control of the fuel flow to the burners 133 and 134.

The other end of the fuel tank 140 is supported from the adjacent end wall 126 of the housing 120 by an arcuate straplike support clip 145. The support clip 145 is preferably formed from a resilient material and is pivotally mounted at one end thereof on the adjacent end wall 126 of the container 120. The radius of curvature of the clip member 145 may be slightly greater than the radius of curvature of the cylindrical wall of the tank 140 to permit longitudinal movement of the tank 140 in the clip 145, with the clip 145 so mounted that the free end thereof is spaced from the end wall 126 by a distance slightly less than the diameter of the tank 140, whereby the tank 140 may be resiliently urged into engagement with the clip 145 and securely held thereby. Alternatively, the radius of curvature of the clip member 145 may be slightly less than the radius of curvature of the cylindrical wall of the tank 140 to lightly grip the tank 140 while presenting only slight resistance to the sliding movement of the tank 140 in the clip 145. By reason of the pivotal mounting of the clip 145 and the pivotal connection of the fitting 141, the housing 110 may be moved between its open and closed positions without disengaging the tank 140 from the burner assembly 132, the free end of the tank 140 sliding in the clip 145 and the clip 145 pivotally moving between the positions shown in FIGS. 1 and 5.

Both the clip 145 and the connection fitting 141 are preferably detachably mounted on the end walls 126 and 116, whereby the tank 140 and the clip 145 may be completely detached from the outer surfaces of the housings 110 and 120 and stored in the housing 120 for transit if desired.

Pivotally mounted on the upper edge of the sidewall 114 of the housing 110 is a foldable windscreen generally designated by the numeral 150. The windscreen 150 comprises a flat rectangular main plate 152 hingedly attached at the bottom edge thereof to the upper edge of the sidewall 114 by suitable hinge structure 153, and a pair of trapezoidal wing plates 154 and 156. Each of the wing plates 154 and 156 is hingedly attached at one edge thereof to one of the opposite ends of the main plate 152 by suitable hinges 157. Disposed respectively along the lower edges of the wing plates 154 and 156 are generally triangularly shaped notches 158 and 159 for engagement with the upper edges of the end walls 116 and 117 as shown in FIG. 1. The wing plates 154 and 156 are preferably resilient enough to allow sufficient bending of the outer ends thereof to permit engagement of the notches 158 and 159 with the end walls 116 and 117, respectively.

The foldable windscreen 150 is pivotally movable between an erected condition as shown in FIGS. 1 and 2 in solid lines and a folded condition shown in broken lines in FIG. 2. In the erected condition thereof the main plate 152 extends substantially vertically upwardly from the upper edge of the sidewall 114 and the wing plates 154 and 156 extend outwardly from the main plate 152 substantially normal thereto, the notches 158 and 159 engaging the upper edges of the end walls 116 and 117 to maintain the windscreen 150 in this erected condition. In moving from the erected condition thereof to the folded condition thereof the wing plates 154 and 156 are swung inwardly as designated by the arrows in FIG. 1 until they lie against the inner surface of the main plate 152 parallel thereto. Then the main plate is swung downwardly as indicated by the arrows in FIGS. 1 and 2 to a position overlying the bottom wall 112 substantially parallel thereto. A pair of latch members 155 are provided for securing the windscreen 150 in its folded condition. While any suitable latch means may be used for this purpose, there has been shown a pair of L-shaped brackets respectively pivotally mounted on the inner surfaces of the end walls 116 and 117 and movable into a position overlapping the outer ends of the windscreen 150 in the folded condition thereof as shown in FIG. 2.

Centrally located in the bottom wall 112 of the housing 110 and attached to the outer surface thereof is a handle assembly, generally designated by the numeral 160, and comprising a mounting plate 161, a bearing bracket 170 and a handle 175. The mounting plate 161 comprises a flat substantially rectangular backwall 162, and an encompassing side flange 163 integral with the backwall 162 along the periphery thereof and extending outwardly therefrom substantially normal thereto, and an attachment flange 164 integral with the outer edge of the side flange 163 along the periphery thereof and extending outwardly therefrom substantially normal thereto. Along a portion of the side flange 163 adjacent to one edge of the rectangular backwall 162 is an inturned lip portion 166 formed by stamping or punching the side flange 163. The central portion of the backwall 162 includes an inwardly depressed pocket flange 167 substantially rectangular in shape and formed by stamping or punching the backwall 162, the flange 167 being integral along three edges thereof with the backwall 162 and separated from the wall 162 along a fourth edge to define a pocket.

The bearing bracket 170 is generally rectangular in shape, the opposite ends thereof being indented slightly to provide a generally rectangular tongue portion 171. A generally arcuate channel 172 is stamped in the bearing bracket 170 and runs lengthwise thereof. The channel 172 is integral along the sides thereof with the bearing bracket 170, but is separated from the bracket 170 at the channel ends, thereby defining a pair of openings 173, whereby the channel 172 provides a bearing for the handle 165 as will be more fully described hereinafter. A pair of crimps or depressions 174 are respectively located in the channel 172 a short distance inwardly from the end openings 173. A pair of shoulder portions 176 are formed integral with the channel 172 and the bearing bracket 170 adjacent to the openings 173, the shoulders 176 being offset from the channel 172 and substantially parallel thereto. The tongue portion 171 of the bearing bracket 170 is adapted to fit under the pocket flange 167 of the mounting plate 161 and the opposite edge of the bearing bracket 170 fits under the inturned lip 166 of the mounting plate 161 and in this position the bearing bracket 170 is securely attached to the mounting plate 161.

The handle 175 comprises a generally C-shaped rod having a pair of legs 177 connected by an integral bight 178 and each having an inturned end 179, the rod having a radius substantially equal to the radius of curvature of the channel 172 whereby the inturned ends 179 fit into the opposite ends of the channel 172 through the openings 173 as can best be seen in FIG. 3. In this position the movement of the handle 175 longitudinally of the channel 172 is restricted by the crimps 174 and by the side flange 163 of the mounting plate 161. However, the handle 175 is capable of pivotal movement about the longitudinal axis of the channel 172 between a folded configuration lying against the backwall 162 and completely within the side flange 163 of the mounting plate 161 as shown in broken lines in FIGS. 3 and 4, and an erected configuration extending outwardly from the backwall 162 at an angle thereto as shown in solid lines in FIG. 4. The inturned ends 179 of the handle 175 are preferably disposed at a slight angle to the longitudinal axis of the channel 172 so that when inserted therein they bear against the inner surface of the channel 172 and against the shoulder portions 176 so as to frictionally hold the handle 175 in either one of its folded and erected configurations. Further, the legs 177 bear against the shoulder portion 176 in the erected configuration of the handle 175 whereby outward movement of the handle 175 from its folded configuration to its erected configuration is limited so that in its erected configuration the handle 175 is disposed at an angle of no more than a few degrees beyond a position normal to the backwall 162. The outward extent of the handle 175 in its erected configuration beyond the mounting flange 164 is substantially equal to the difference between the depths of the housings 110 and 120, whereby when the handle is in its erected configuration and the housing 110 is in its open position, the handle 175 rests upon the ground or other supporting surface of the stove 100 to serve as a leg for supporting the housing 110.

Preferably, the bottom wall 112 of the housing 110 has a centrally positioned rectangular opening therein (not shown) into which the recessed portion of the mounting plate 161 formed by the backwall 162 and the side flange 163 is inserted. In this position the attachment flange 164 of the mounting plate 161 overlies the bottom wall 112 around the periphery of the rectangular opening therein and can be suitably attached thereto as by welding. Alternatively, it is also possible to construct bottom wall 112 with a depressed portion therein into which the bearing bracket 170 and the handle 175 could be inserted, the depressed portion of the bottom wall 112 taking the place of the mounting plate 161.

Considering the operation of the camp stove 100, in its normally closed position as illustrated in FIG. 5, the housings 110 and 120 are latched together and the handle 175 may be moved to its erected configuration for carrying the stove 100. In this position the windscreen 150 is folded as indicated by broken lines in FIG. 2 and forms a cover for the housing 120 thereby defining a closed storage compartment therein. In this closed position, the fuel tank 140 may be attached in its operative position to the exterior of the housings 110 and 120 as shown in FIG. 5 or may be stored inside the compartment formed by the windscreen 150 and the housing 120.

When it is desired to use the portable camp stove 100 for cooking, the latch 119 is released and the housing 110 is moved to its open position as illustrated in FIGS. 1 and 2, the handle 175 being moved to its erected configuration to serve as a leg for supporting the housing 110. The windscreen 150 is then unlatched and moved to its erected condition shown in FIG. 1, the wing plates 154 and 156 being engaged with the end walls 116 and 117 by means of the notches 158 and 159 to hold the windscreen 150 in its erected condition. If the fuel tank 140 has been stowed in the housing 120, it is connected to the burner assembly 132 by means of the fitting 141 and is mounted on the exterior of the housing 120 by means of the support clip 145. Flow of fuel from the tank 140 to the burner assembly 132 may then be regulated by the valve knobs 142 and 144 in a well-known manner. After the meal is completed, housing 120 may be detached from the housing 110 at the hinge assemblies 125 and the housing 120 may then be used as a dishpan since this housing is completely watertight by reason of its singlepiece construction. Alternatively, of course, it is also possible to disengage the housing 120 from the housing 110 prior to the cooking operation and in this case the handle 175 would be moved to its folded configuration and the bottom wall 112 of the housing 110 would lie flat upon the ground or other supporting surface.

It will be noted that the deep-drawn singlepiece construction of the housings 110 and 120 permits these housings to be formed simply and economically with rounded corners so that the housings present no sharp edges to the user. This construction also results in the housings being watertight to permit the use of the housing 120 as a dishpan when not in use as a storage compartment.

It is a particularly advantageous feature of this invention that the housings which form the container for the camp stove 100 can be assembled in a modular arrangement for varying the number of housings used and the volume of storage space provided therein. This aspect of the invention is facilitated by the detachable interconnection of the housings as at hinge assemblies 125. Referring to FIG. 6 of the drawing, there is shown a second embodiment of a portable camp stove according to this invention generally designated by the numeral 200. This embodiment comprises a single deep-drawn seamless housing 210 having a flat substantially rectangular bottom wall 212 integral along the periphery thereof with a pair of substantially rectangular upstanding sidewalls 214 and a pair of substantially rectangular upstanding end walls 216, the end walls 216 being respectively integral with and having the same vertical extent as the sidewalls 214. Hingedly attached to the upper edge of one of the sidewalls 214 is a foldable windscreen 250 identical to the windscreen 150 described with respect to FIG. 1 and being shown in FIG. 6 in the folded condition thereof. A pair of L-shaped latch brackets 255 are provided for securing the windscreen 250 in its folded condition whereby the windscreen 250 forms a cover for the housing 210. The housing 210 contains heating apparatus (not shown) substantially identical to the burner assembly 132 and grate 135 shown in FIGS. 1 and 2. Attached to the outer surface of the bottom wall 212 are a pair of handles 265 and 275 similar to the handle illustrated in FIGS. 3 and 4 and movable between a carrying configuration shown in solid lines in FIGS. 6 wherein the handles are angularly disposed toward one another to facilitate the gripping thereof with one hand and a supporting configuration wherein the handles are disposed angularly away from each other as shown in dotted lines in FIG. 6 to serve as legs for supporting the housing 210 for use in cooking. This embodiment is extremely compact and, of course, requires that the fuel supply unit (not shown) be carried externally of the camp stove 200.

In FIG. 7 there is shown a third embodiment of the portable camp stove according to this invention generally designated by the numeral 300 and comprising a pair of singlepiece deep-drawn housings 310 and 320, equal in depth and substantially identical to the housing 210. The housings 310 and 320 are hingedly secured together by means of hinge assemblies 325 which are identical to the hinge assemblies 125 as shown in FIGS. 1 and 2. The housing 310 is pivotally movable on the hinge assemblies 325 between the closed position shown and open position lying alongside the housing 320 and similar to that shown in FIGS. 1 and 2. A pair of handles 365 and 375 are respectively attached to the bottom walls of the housings 310 and 320, each of the handles 365 being identical to the handle 165 as shown in FIGS. 3 and 4. With this arrangement it is possible to carry the stove 300 when either the housing 310 or the housing 320 is disposed upwardly. In the open position of the stove 300 the housings 310 and 320 may both rest flat upon the ground or other supporting surface with the handles 365 and 375 in their folded configurations or, alternatively, the handles 365 and 375 may be in their erected configurations and serve as legs for respectively supporting the housing 310 and 320. Furthermore, in this embodiment, a heating apparatus comprising a burner assembly and overlying grate identical to that shown in FIG. 1 may be mounted in either or both of the housings 310 and 320. In the former case the stove 300 comprises a two-burner cooking unit and a small storage compartment, and in the latter case, the stove 300 comprises a four-burner cooking unit with no storage compartment. A foldable windscreen (not shown) identical to the windscreen 150 is also hingedly mounted on whichever of the housings 310 and 320 contains the heating apparatus, and a fuel tank (not shown) identical to the tank 140 shown in FIG. 1 is provided for mounting upon the exterior of the housings 310 and 320 in the manner illustrated with respect to FIGS. 1 and 5.

As shown in FIG. 9, it is also possible to add any number of additional housings to increase the capacity of the portable camp stove. By way of example, a camp stove generally designated by the numeral 400 is shown in FIG. 9 and comprises three seamless deep-drawn housings 410, 420 and 480. The housings 410 and 420 are hingedly secured together by hinge assemblies 425 and each carry a handle on the bottom wall thereof respectively designated 465 and 475, all of these members 410, 420, 425, 465 and 475 being identical to the corresponding members 310, 320, 325, 365 and 375 shown in FIG. 7. The additional housing 480 is of substantially the same shape and construction as the housings 410 and 420 and may be of the same or of different depth. In their assembled configuration the housings 410 and 420 are disposed atop the housing 480 and are latchable in this position by means of a pair of suitable latches 490, respectively interconnecting the adjacent end walls of the housings 420 and 480. The latches 490 may, for example, be of the loop or bail-type. Any or all of the housings 410, 420 and 480 may contain heating apparatus comprising burner assemblies and overlying grates as shown in FIG. 1, each of the housings so equipped being also provided with a foldable windscreen identical to the windscreen 150 as shown in FIG. 1. It will be understood that any number of housing modules may be connected together in this manner to provide a wide variety of cooking capacities and storage capacities for the portable camp stove of this invention.

If desirable, those of the housing modules which are used as storage compartments may be lined with suitable insulating material as may be the foldable windscreen for facilitating the storage of hot or cold articles in the storage compartments. All the parts of the portable camp stove according to this invention, in particular the housings and the windscreen plates are preferably formed of thin-gauge sheet metal thereby providing for simple and economical fabrication by means of stamping and drawing techniques and allowing the seamless watertight construction described above. The camp stove according to this invention may use any suitable liquid or gaseous fuel, but preferably utilizes a gaseous hydrocarbon fuel such as propane. It will be noted that the support clip 145 for the fuel tank 140 is detachably mounted on the end wall 126 of the housing 120 so that it may be removed and stored within the housing 120 when not in use, thereby presenting a smooth exterior surface for the housing 120.

It can be seen, therefore, that there has been disclosed a portable camp stove comprising at least two singlepiece housings detachably hinged together, at least one of which contains cooking apparatus and the others of which may serve as storage compartments or, when detached from the other housings, may serve as dishpans.

Further, there has been disclosed a camp stove including a foldable windscreen which may be latched in a folded position overlying that housing which contains the cooking apparatus and forming a cover therefor, whereby a compact camp stove comprising only a single housing is possible since additional housings are not necessary to provide a cover for the one housing. There has also been disclosed a camp stove wherein the hinged-together housings may be of different depths, the shallower housing being supported in its open position by a handle apparatus which in its erected configuration serves as a leg for the shallow housing.

There has also been disclosed a portable camp stove comprising two hingedly connected housings and including a fuel tank and support means for pivotally supporting the tank on the external walls of the housings when the housings are in either their open or their closed position, the tank and the support means both preferably being detachable from the housing walls for optional storage within one of the housings during transit.

Finally, there has been described a camp stove which is readily adaptable to a modular assembly of a plurality of housings whereby the cooking capacity and the storage capacity of the portable camp stove may be varied at will.

While there has been described what is at present considered to be the preferred embodiment of the invention, it will be understood that various modifications may be made therein, and it is intended to cover in the appended claims all such modifications as fall within the true spirit and scope of the invention.

We claim:

1. A portable camp stove comprising a first open-top housing having a bottom wall and an encompassing upstanding sidewall, a burner assembly mounted in said first housing, a grate mounted in said first housing and overlying said burner assembly, a fuel supply unit releasably interconnected with said burner assembly for supplying fuel thereto, a second watertight open-top housing having a bottom wall and an encompassing upstanding sidewall, and hinge structure detachably interconnecting said first and second housings, said second housing being capable of serving as a storage compartment when connected to said first housing and as a dishpan when detached from said first housing, said first housing being pivotally movable on said hinge structure between an open position alongside said second housing and a closed position overlying and contacting said second housing to form a closed container for said stove.

2. The portable camp stove set forth in claim 1, wherein each of said first and second housings is formed from a single seamless piece of material.

3. The portable camp stove set forth in claim 1, wherein the bottom wall of each of said first and second housings is flat and substantially rectangular in shape.

4. A portable camp stove comprising a first open-top housing having a bottom wall and an encompassing upstanding sidewall, a burner assembly mounted in said first housing, a grate mounted in said first housing and overlying said burner assembly, a fuel supply unit releasably interconnected with said burner assembly for supplying fuel thereto, a foldable windscreen hingedly attached to the sidewall of said first housing along the upper edge thereof, said windscreen being movable between an erected condition extending substantially vertically upwardly from the upper edge of said sidewall and a folded condition substantially normal to said sidewall and overlying said bottom wall, latch means for securing said windscreen to said first housing when said windscreen is in the folded condition thereof thereby providing a cover for said first housing, a second watertight open-top housing having a bottom wall and an encompassing upstanding sidewall, and hinge structure detachably interconnecting said first and second housings, said first housing being pivotally movable on said hinge structure between an open position alongside said second housing and a closed position overlying and contacting said second housing to form a closed container for said stove, said second housing cooperating with said windscreen in the folded condition thereof to define a storage compartment when connected to said first housing in the closed position thereof and being capable of serving as a dishpan when detached from said first housing.

5. The portable camp stove set forth in claim 4, wherein said windscreen comprises a main plate hingedly attached to the sidewall of said first housing along the upper edge thereof and two wing plates hingedly secured to said main plate along opposite side edges thereof, said main plate being movable between an erected condition extending substantially vertically upwardly from the upper edge of said sidewall of said first housing and a folded condition substantially normal to said sidewall of said first housing overlying said bottom wall thereof, said wing plates being movable when said main plate is in the erected condition thereof between an open position extending inwardly from said main plate substantially normal thereto and a folded position lying against and parallel to the inner surface of said main plate.

6. The portable camp stove set forth in claim 5, wherein said main plate and the bottom wall of each of said first and second housings are flat and substantially rectangular in shape, said main plate having dimensions substantially the same as the dimensions of said bottom walls, and wherein each of said wing plates is substantially trapezoidal in shape and has means for engaging the sidewall of said first housing when said wing plates are in the open position thereof.

7. A portable camp stove comprising a first open-top housing having a bottom wall and an encompassing upstanding sidewall of a first predetermined height, a burner assembly mounted in said first housing, a grate mounted in said first housing and overlying said burner assembly, a fuel supply unit releasably interconnected with said burner assembly for supplying fuel thereto, a second open-top housing having a bottom wall and an encompassing upstanding sidewall of a second predetermined height exceeding said first predetermined height by a predetermined distance, hinge structure detachably interconnecting said first and second housings along the upper edges thereof, said first housing being pivotally movable on said hinge structure between an open position suspended from and alongside said second housing and a closed position overlying and contacting said second housing to form a closed container for said stove, latch means for securing said second housing to said first housing in the closed position thereof, a handle attached to the outer surface of the bottom wall of said first housing and movable between a folded configuration lying against said surface and an erected configuration disposed at an angle to said surface, said handle in the erected configuration thereof extending outwardly in a direction substantially normal to said surface a distance substantially equal to said predetermined distance, whereby said handle in the erected configuration thereof acts as a leg to support said first housing in the open position thereof and acts as a handle for carrying said stove container when said first housing is latched in the closed position thereof.

8. The portable camp stove set forth in claim 7, wherein the bottom wall of said first housing has a substantially rectangular recessed portion therein, and wherein said handle is mounted in said recessed portion and in the folded configuration thereof is completely contained within said recessed portion.

9. The portable camp stove set forth in claim 7, and further including means for maintaining said handle in the folded and erected configurations thereof.

10. A portable camp stove comprising a first open-top housing having a bottom wall and an encompassing upstanding sidewall, a burner assembly mounted in said first housing, a grate mounted in said first housing and overlying said burner assembly, a generally cylindrical fuel tank disposed externally of said first housing and releasably pivotally interconnected adjacent to one end thereof with said burner assembly for supplying fuel thereto, a second watertight open-top housing having a bottom wall and an encompassing upstanding sidewall, hinge structure detachably interconnecting said first and second housings, said second housing being capable of serving as a storage compartment when connected to said first housing and as a dishpan when detached from said first housing, said first housing being pivotally movable on said hinge structure between an open position alongside said second housing and a closed position overlying and contacting said second housing to form a closed container for said stove, a support clip pivotally mounted on the sidewall of said second housing adjacent to the connection point of said fuel tank to said burner assembly for supporting the other end of said fuel tank, said fuel tank swinging pivotally about its connection point with said burner assembly and said support clip pivotally moving to accommodate said tank when said first housing is moved between the open and closed positions thereof whereby said clip holds said tank when said first housing is in both the open and closed positions thereof.

11. The portable camp stove set forth in claim 10, wherein said support clip comprises an arcuate resilient member pivotally attached at one end thereof to the sidewall of said second housing, the radius of the arc of said arcuate member being slightly smaller than the radius of said cylindrical tank whereby said clip may be resiliently urged about the periphery of said tank.

12. A portable camp stove comprising an open-top housing having a bottom wall and an encompassing upstanding sidewall, a burner assembly mounted in said housing, a grate mounted in said housing and overlying said burner assembly, a fuel supply unit releasably interconnected with said burner assembly for supplying fuel thereto, a foldable windscreen hingedly attached to said sidewall along the upper edge thereof, said windscreen being movable between an erected condition extending substantially vertically upwardly from the upper edge of said sidewall and a folded condition substantially normal to said sidewall and overlying said bottom wall. latch means for securing said windscreen to said housing when said windscreen is in the folded condition thereof thereby providing a cover for said housing, and two handles attached to the outer surface of said bottom wall and movable between a carrying configuration extending angularly toward each other and a supporting configuration extending angularly away from each other, whereby said handles in the supporting configuration thereof act as legs to support said housing when said bottom wall is disposed downwardly of said windscreen for cooking and act as handles for carrying said stove when said windscreen is latched in the folded condition thereof and is disposed downwardly of said bottom wall.

13. A portable camp stove comprising a first open-top housing having a first bottom wall and an encompassing upstanding first sidewall, a second watertight open-top housing having a second bottom wall and an encompassing upstanding second sidewall of substantially the same height as said first sidewall, hinge structure detachably interconnecting said first and second housings, said first housing being pivotally movable on said hinge structure between an open position alongside said second housing and a closed position overlying and contacting said second housing to form a closed container for said stove, a burner assembly mounted in one of said housings, a grate mounted in said one housing and overlying said burner assembly, a fuel supply unit releasably interconnected with said burner assembly for supplying fuel thereto, two handles respectively attached to the outer surfaces of said first and second bottom walls and each movable between a folded configuration lying against the associated bottom wall and an erected configuration disposed at an angle to the associated bottom wall, latch means for securing said second housing to said first housing in the closed position thereof, the other of said housings being capable of serving as a storage compartment when connected to said one housing and as a dishpan when detached from said one housing.

14. The portable camp stove set forth in claim 13 and further including a foldable windscreen hingedly attached to the sidewall of said one housing along the upper edge thereof, said windscreen being movable between an erected condition extending substantially vertically upwardly from the upper edge of said sidewall of said one housing and a folded condition substantially normal to said sidewall of said one housing and overlying the bottom wall thereof, whereby said windscreen in the folded condition thereof provides a cover for said one housing and cooperates with the other of said housings to define a closed storage compartment when said housings are latched together.

15. A portable camp stove comprising a first open-top housing having a bottom wall of predetermined shape and dimensions and an encompassing upstanding sidewall, a second watertight open-top housing having a bottom wall of said predetermined shape and dimensions and an encompassing upstanding sidewall, hinge structure detachably interconnecting said first and second housings, said first housing being pivotally movable on said hinge structure between an open position alongside said second housing and a closed position overlying and contacting said second housing to form a closed container for said stove, latch means for securing said second housing to said first housing in the closed position thereof, a third watertight open-top housing having a bottom wall of said predetermined shape and dimensions and an encompassing upstanding sidewall, latch means for detachably securing said second housing to said third housing when said second housing overlies and contacts said third housing thereby achieving a modular coupling of said housings and a corresponding increase in the storage capacity of said stove container, a burner assembly mounted in one of said housings, a grate mounted in said one housing and overlying said burner assembly, a fuel supply unit releasably interconnected with said burner assembly for supplying fuel thereto, two handles respectively attached to the outer surfaces of the bottom walls of said first and second housings and each movable between a folded configuration lying against an associated bottom wall and an erected configuration disposed at an angle to the associated bottom wall, the other of said housings each providing a storage compartment when connected respectively to each other and to said one housing and each capable of serving as a dishpan when detached from each other and from said first housing.

16. The portable camp stove set forth in claim 15, and further including a foldable windscreen hingedly attached to the sidewall of said one housing along the upper edge thereof, said windscreen being movable between an erected condition extending substantially vertically upwardly from the upper edge of said side wall of said one housing and a folded condition substantially normal to said sidewall of said one housing and overlying the bottom wall thereof, whereby said windscreen in the folded condition thereof provides a cover for said one housing and cooperates with the other of said first and second housings to define a closed storage compartment when said first and second housings are latched together.